US008978523B2

(12) United States Patent
Stanfield et al.

(10) Patent No.: US 8,978,523 B2
(45) Date of Patent: Mar. 17, 2015

(54) FASTENER TOOL ASSEMBLY FOR INSTALLING BREAKAWAY TORQUE NUTS

(71) Applicants: Jimmy Blake Stanfield, Kemp, TX (US); John Bland Schoolland, Westlake Village, CA (US)

(72) Inventors: Jimmy Blake Stanfield, Kemp, TX (US); John Bland Schoolland, Westlake Village, CA (US)

( * ) Notice: Subject to any disclaimer, the term of this patent is extended or adjusted under 35 U.S.C. 154(b) by 215 days.

(21) Appl. No.: 13/862,706

(22) Filed: Apr. 15, 2013

(65) Prior Publication Data

US 2014/0026719 A1  Jan. 30, 2014

Related U.S. Application Data

(60) Provisional application No. 61/675,616, filed on Jul. 25, 2012.

(51) Int. Cl.
| B25B 23/00 | (2006.01) |
|---|---|
| B25B 23/04 | (2006.01) |
| B25B 23/10 | (2006.01) |
| B25B 13/06 | (2006.01) |
| B25B 13/46 | (2006.01) |
| B25B 23/14 | (2006.01) |
| F16B 31/02 | (2006.01) |

(52) U.S. Cl.
CPC ........... *B25B 23/0085* (2013.01); *B25B 23/045* (2013.01); *B25B 23/105* (2013.01); *B25B 13/06* (2013.01); *B25B 13/461* (2013.01); *B25B 23/108* (2013.01); *B25B 23/1415* (2013.01); *F16B 31/021* (2013.01)
USPC .................................. 81/125; 81/55; 81/124.2

(58) Field of Classification Search
CPC ...... B25B 13/02; B25B 13/06; B25B 13/461; B25B 23/0085; B25B 23/045; B25B 23/105; B25B 23/108; B25B 23/1415
USPC .......................... 81/124.1, 124.2, 125, 13, 55
See application file for complete search history.

(56) References Cited

U.S. PATENT DOCUMENTS

| 7,347,129 | B1 * | 3/2008 | Youtsey ........................... 81/467 |
|---|---|---|---|
| 8,430,001 | B2 * | 4/2013 | Ortiz ............................. 81/124.1 |
| 2004/0035259 | A1 * | 2/2004 | Erwin ........................... 81/124.2 |
| 2011/0017025 | A1 * | 1/2011 | Firzlaff ......................... 81/121.1 |
| 2013/0192039 | A1 * | 8/2013 | Trusty ........................... 29/426.5 |
| 2013/0233133 | A1 * | 9/2013 | Nelson ......................... 81/121.1 |

* cited by examiner

*Primary Examiner* — David B Thomas
(74) *Attorney, Agent, or Firm* — Kelly & Kelley, LLP (57) ABSTRACT

A fastener tool assembly for installing breakaway torque nuts includes a socket having a first end attachable to a driver of a fastening tool. A second end of the socket operably engages a detachable wrenching ring of a breakaway torque nut. A window is formed in a sidewall of the socket, sized and configured to permit at least one wrenching ring to pass therethrough. A catch permits insertion of the wrenching ring into the socket, but prevents the detached wrenching ring from freely falling out of the open end of the socket. A sleeve associated with the window selectively permits passage of one or more detached wrenching rings through the window, or prevents passage of the detached wrenching rings therethrough.

23 Claims, 6 Drawing Sheets

FASTENER TOOL ASSEMBLY FOR INSTALLING BREAKAWAY TORQUE NUTS

BACKGROUND OF THE INVENTION

The present invention generally relates to wrenching tools. More specifically, the present invention is directed to a fastener tool assembly for installing and ejecting breakaway torque nuts.

The aerospace industry has made use of "broached-pin" fastening systems for over fifty years. There are many variations, all having in common a method of keeping the bolt or pin from rotating while a nut element is threaded onto it and tightened. Many of the fastening systems used in the aerospace industry are of the frangible fastener type. One such example is the Hi-Lok® fastening system. Such frangible fasteners are used extensively in the aerospace industry due to their simplicity, consistently controlled preload torque and minimum size and weight.

Figure 1:
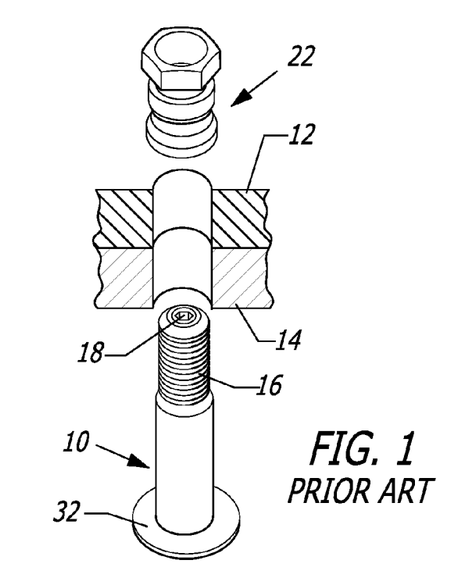
FIG. 1 is a partially cross-sectional and perspective view of a prior art bolt and nut element of a frangible air frame fastening system for attaching two objects.
Figure 2:
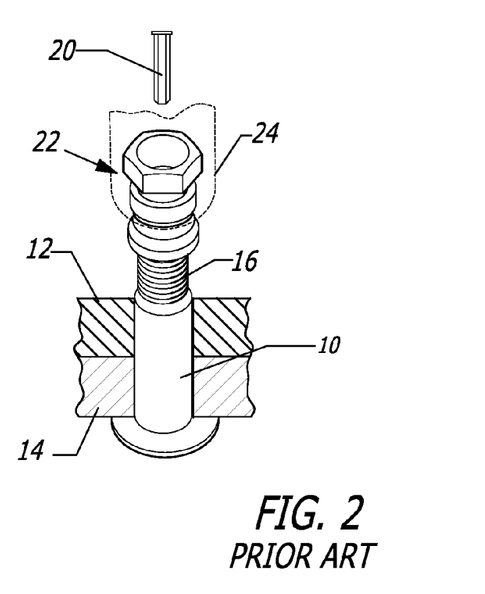
FIG. 2 is a similar view as FIG. 1, illustrating the nut element being fastened to the bolt.

FIGS. 1-4 illustrate a typical frangible fastening system. A bolt 10 is extended through the objects 12 and 14 to be fastened to one another, as illustrated in FIGS. 1 and 2. A threaded portion 16 of the bolt extends beyond the aligned objects 12 and 14. Access to the head 32 of the bolt 10 is usually not possible, and for reasons of weight saving and aerodynamics, the heads 32 of the fasteners are flat so as to be flush with the skin of the aircraft structure, or only protrude slightly. Moreover, these heads 32 do not have any external "hex" or other shape to grip with a wrench to keep the bolt 10 from rotating and turning. Instead, the threaded end 16 of the bolt 10 is provided with an internal hex recess 18 into which a hex-Allen key wrench 20 may be inserted to hold the bolt 10 stationary while an internally threaded nut 22 is fastened thereto.

Figure 3:
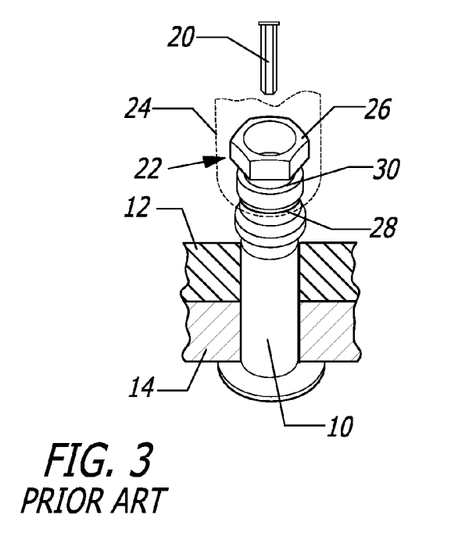
FIG. 3 is a view similar to FIG. 2, illustrating the nut element fastened to the bolt.

As illustrated in FIGS. 2 and 3, the operator holds the hex key Allen wrench 20 with one hand, while operating a wrench, typically having a socket 24 at an end thereof, to hold the bolt 10 in place while the nut 22 is fastened onto the threaded portion 16 thereof. Power tools have been developed which incorporate the hex key 20 into the tool. In the same manner, the power tool holds the hex key 20 stationary while the socket 24 is used to thread the nut element 22 onto the threaded end 16 of the bolt 10.

Figure 4:
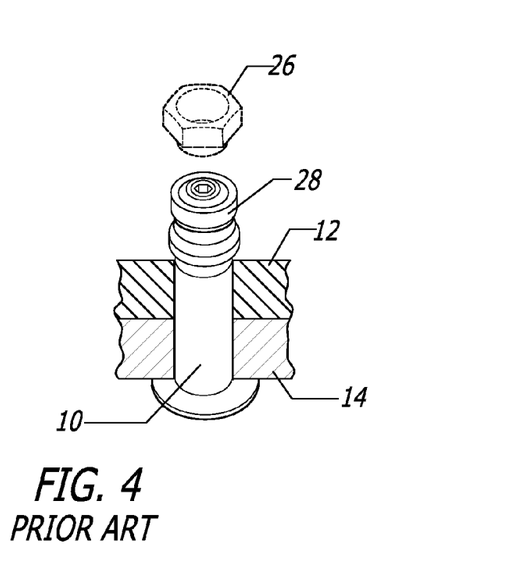
FIG. 4 is a perspective and cross-sectional view illustrating the shearing of the wrenching ring from the collar once the collar and bolt have been fully attached to one another.

The nut 22 includes a wrenching ring 26 which is configured to engage the socket 24 and an internally threaded collar portion 28. An intermediate neck portion 30 shears the frangible wrenching ring portion 26 from the collar 28 when the applied torque exceeds a predetermined torsional loading, as illustrated in FIG. 4.

The fasteners are applied with one of a variety of wrenching tools which engage the wrenching ring 26 to apply rotational force to the threaded collar 28 and twist the wrenching ring from the threaded collar when the predetermined torsional loading is exceeded. The break-off torque depends on the depth of the groove 30 in the neck which can be selected to meet different torque requirements.

There are typically very strict quality control requirements and measures taken with respect to the installation of breakaway torque nut airframe fasteners. For every breakaway torque nut 22 and bolt 10 used in constructing or repairing the aircraft or other device, a strict accounting of each detached wrenching ring of the breakaway torque nut is required. In some cases, the detached wrenching ring becomes lodged within the open end of the socket used to install the breakaway torque nut 22 to the bolt 10. In this case, the installer must tap the end of the socket 24 containing the wrenching ring 26 to dislodge it from the socket 24. This must be done carefully so that the detached wrenching ring 26 does not become lost. In other instances, the detached wrenching ring 26 easily slips out of and falls away from the socket 24. Of course, this increases the chances that the detached wrenching ring 26 will fall or roll, etc. into an undesirable place or even become lost. In such cases, the installer must cease his or her work and find the lost wrenching ring 26. In some cases, this requires the halting of the manufacturing line until the lost wrenching ring 26 is located and retrieved.

Accordingly, there is a continuing need for a fastener tool assembly for installing and ejecting wrenching rings of breakaway torque nuts. Such an assembly should controllably contain the detached wrenching ring until it is intentionally removed from the assembly. Such an assembly should also permit the installation of several breakaway torque nuts to bolts of the fastener system before requiring that the wrenching rings be removed and collected so as to increase the productivity of the worker. The present invention fulfills these needs, and provides other related advantages.

SUMMARY OF THE INVENTION

The present invention resides in a fastener tool assembly for installing and ejecting breakaway torque nuts. The assembly generally comprises a socket having a first end configured to attach to a driver of a fastener tool. A second end of the socket, generally opposite the first end, is configured to operably engage a detachable wrenching ring of a breakaway torque nut. A generally cylindrical sidewall extends between the first end and the second end, the sidewall having a window formed transversely therein intermediate the first and second ends. A lower edge of the window is spaced from a lower edge of the socket at least a distance corresponding to a plurality of stacked wrenching rings. The window is sized and configured to permit at least one wrenching ring to pass therethrough.

The socket includes a catch configured to permit insertion of the wrenching ring into the second end of the socket, but prevent the detached wrenching ring from freely falling out of the second end of the socket. The catch typically comprises a resilient ring or clip disposed within the socket adjacent to the second end.

In a particularly preferred embodiment, a gate is associated with the window. The gate is adapted to selectively permit passage of a detached wrenching ring through the window or prevent passage of the detached wrenching ring through the window. The gate typically comprises a sleeve slidably disposed on the sidewall of the socket, which has an aperture selectively alignable with the window. The sleeve is typically comprised of a resilient material, and includes an elongated slit providing a snap-fit connection to the socket. The sleeve may be disposed over a recess portion of the sidewall, intermediate the first and second ends. The sleeve includes a tab extending into the aperture, which is configured to engage an edge of the window.

A set screw extends through the sidewall of the socket and into engagement with the driver of the fastening tool. At the lower edge of the socket, a cover comprised of a material having a low coefficient of friction is attached thereto. The cover may comprise a self-lubricating Teflon material.

The socket may be attached to a wrench, which includes a handle having a ratchet head. The driver is operably coupled to the ratchet head and the socket. The ratchet head and driver have aligned passageways adapted for the pin to pass therethrough, and through the socket to a bolt of the fastener.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

The present invention is directed to a fastener tool assembly for installing breakaway torque nuts to bolts of a fastening system, and retaining and ejecting in a controlled manner wrenching rings which detach from the torque nuts during installation. Such breakaway torque nuts and bolts are typically used as air frame fasteners of aircraft in aerospace industries.

Figure 5:
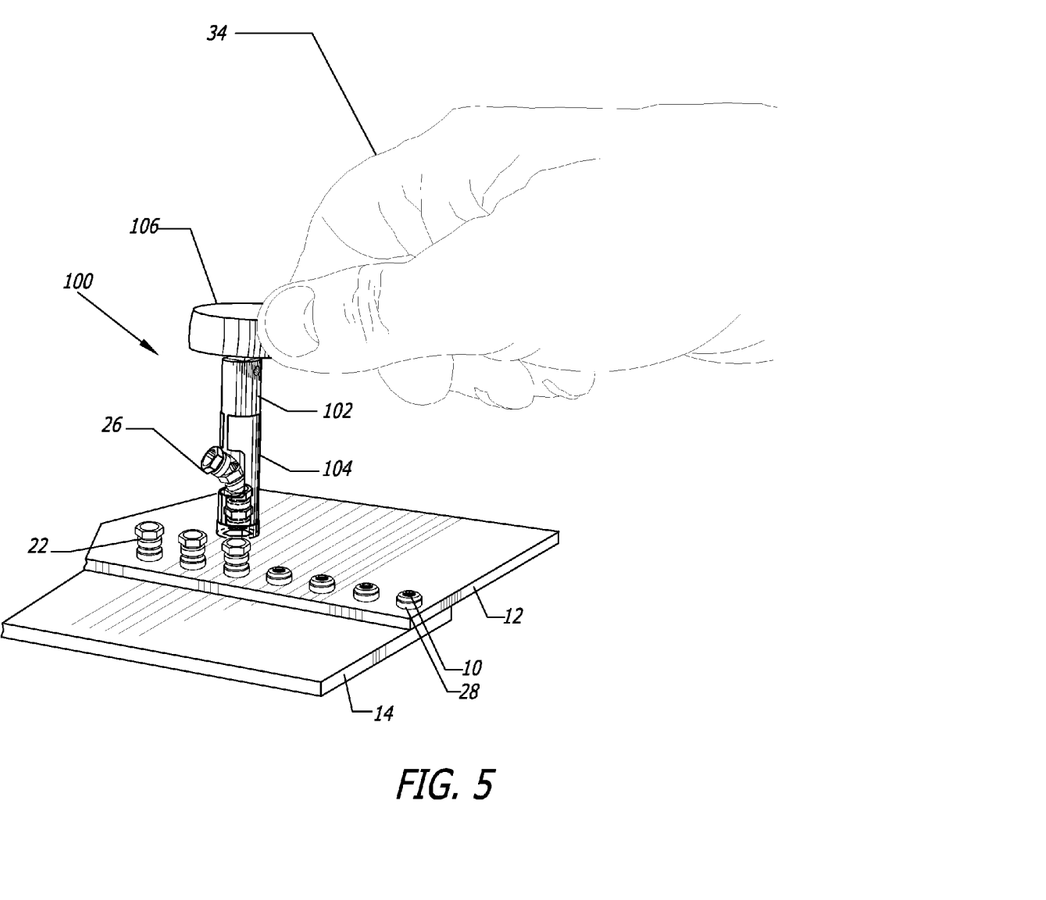
FIG. 5 is a perspective view of the fastener tool assembly of the present invention being utilized to install breakaway torque nuts to corresponding bolts of a fastener system.

With reference now to FIG. 5, a fastener tool assembly 100 embodying the present invention is shown including a socket 102 having a sleeve 104 operably disposed thereon, and actuated by means of a wrench 106. In this case, the wrench 106 is of the manual type operated by a user's hand 34. However, it will be appreciated that the present invention is not limited to such, and instead the fastening tool could comprise a powered wrench device, such as a pneumatic or electric motor-driven wrench device.

It will be seen from FIG. 5 that two objects 12 and 14 are in the process of becoming connected by means of a series of fasteners, including the aforementioned bolt 10 and threaded nut 22 fasteners. As described above, and illustrated in FIG. 5, as the fastener tool assembly 100 of the present invention is used to install the breakaway torque nut 22, the collar portion 28 is left threaded onto the threaded end of the bolt 10. However, the wrenching ring portion 26 is captured within the socket 102. As will be more fully described herein, the socket 102 is designed and configured to retain multiple detached wrenching rings 26 therein, until the wrenching rings 26 are selectively removed from the socket 102, such as by aligning a window of the sleeve 104 with the window of the socket 102.

Figure 6:
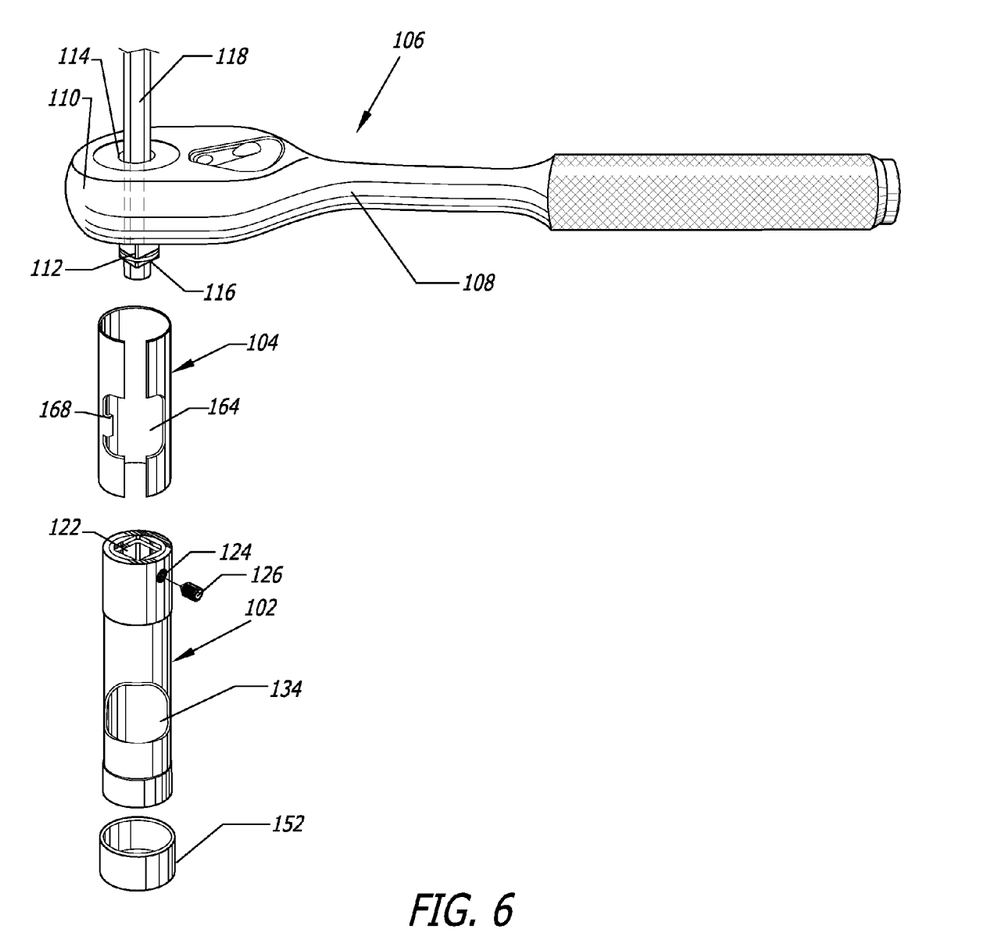
FIG. 6 is a partially exploded perspective view of a fastener tool assembly embodying the present invention.

With reference now to FIG. 6, a fastener tool assembly embodying the present invention is shown including the manual wrench 106 having a handle 108 extending from a ratchet head 110, with a driver 112 operably connected to the ratchet mechanism (not shown) within the ratchet head 110, as is known in the art. The ratchet head 110 includes a passageway 114 aligned with a passageway 116 of the driver for insertion of a multi-faceted key or pin 118 therethrough. The pin 118 has a number of facets typically corresponding with the number of facets in the recess 18 of the bolt 10, so as to hold the bolt 10 and prevent it from rotating during installation of the breakaway torque nut 22, as illustrated and described above. Typically, the pin 118 comprises a hex Allen wrench or key.

Figures 7, 8, 9, 10, 11, 12:
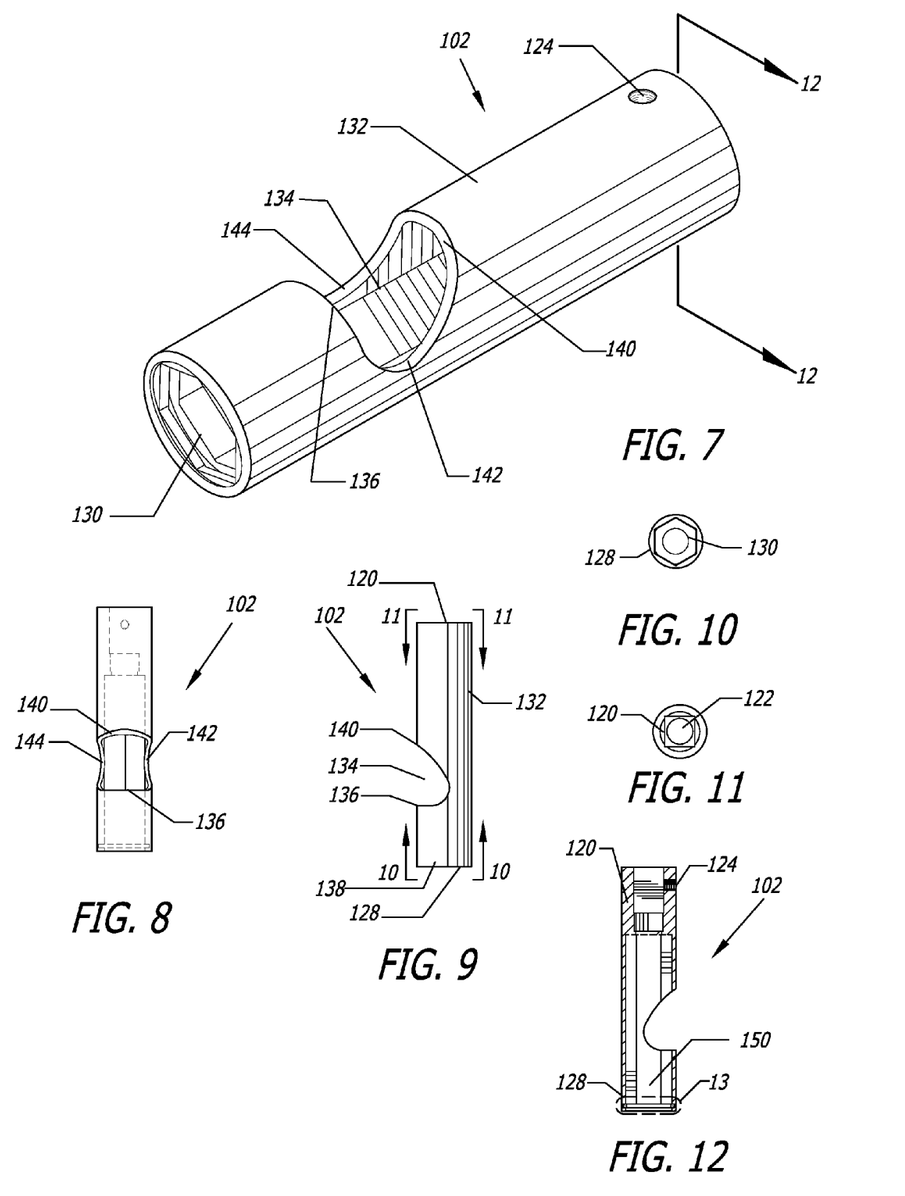
FIG. 7 is a side perspective view of a socket embodying the present invention.
FIG. 8 is a front elevational view of the socket of FIG. 7.
FIG. 9 is a side elevational view of the socket of FIG. 7.
FIG. 10 is an end view taken generally along line 10-10 of FIG. 9.
FIG. 11 is an end view taken generally along line 11-11 of FIG. 9.
FIG. 12 is a cross-sectional view taken generally along line 12-12 of FIG. 7.

With reference now to FIGS. 6-12, the socket 102 has a first end 120 which is configured to attach to the driver 112 of the fastener tool. FIG. 11 illustrates a top view of the socket 102, illustrating the first end 120 of the socket, and a faceted aperture 122 formed in the first end 120 for removably receiving the driver 112 therein. In the embodiment illustrated in FIG. 11, the faceted opening 122 is square, so as to be received upon a square-driver type 112. A threaded aperture 124 may extend through an upper portion of the socket for receipt of a set screw 126 therethrough and into engagement with the driver 112, so as to more securely hold the socket 102 to the driver 112.

The second end 128 of the socket 102 is generally opposite the first end 120 and is configured to operably engage the breakaway torque nut 22, and particularly the wrenching ring 26 portion thereof. For example, as illustrated in FIG. 10, the second end 28 of the socket 102 includes a multi-faceted opening 130 which is slightly larger than the multi-faceted wrenching ring 26 of the breakaway torque nut 22. Typically, the wrenching ring 26 and the opening 130 are hex-shaped, so as to include six facets, although the invention is not limited to such.

It will be understood that the first end 120 and the generally opposite second end 128 of the socket 102 are aligned generally axially with one another. The socket 102 is generally hollow, and includes a passageway extending therethrough such that the pin 118 of the fastener tool 106 can extend therethrough and into engagement with the recess 18 of the bolt 10, as described above.

A sidewall 132 extends between the first end 120 and the second end 128. The sidewall is typically generally cylindrical in configuration. The sidewall 132 may be a wall having a smooth outer surface, as illustrated, or be multi-faceted, but in any event it is generally considered cylindrical in nature.

A window 134 is formed transversely within the sidewall 132, intermediate the first and second ends 120 and 128. The window 134 is sized and configured to permit at least one wrenching ring 26 to pass therethrough, as illustrated in FIG. 5. A lower edge 136 defining the window 134 is spaced a predetermined distance from the lower edge 138 of the socket, which corresponds to a plurality of stacked wrenching rings. That is, the lower edge 136 of the window 134 is preferably spaced a distance from the lower edge 138 of the socket 102 such that two or more detached wrenching rings 26 can temporarily reside within the lower portion of the socket therebetween. An upper edge 140 of the window is spaced a sufficient distance from the lower edge 136 so as to allow passage of at least one wrenching ring 26 therethrough. Sidewalls 142 and 144 of the window 134 are spaced sufficiently apart so as to permit at least one wrenching ring 26 to pass through the window 134.

In a particularly preferred embodiment, the window 134 is formed by the lower edge 136 being cut, or otherwise formed, generally directly into the wall 132 in a transverse manner with respect to the longitudinal axis of the socket 102 a predetermined minimum distance. From the upper edge 140, side edges 142 and 144 are formed as sloping, curved cuts or lines so as to meet, or even extend beyond, the lower edge 136, as illustrated in FIGS. 7-9 and 12. This configuration has been found to be particularly helpful in removing detached wrenching rings 26, although other cut-out window configurations are contemplated by the invention.

The following are examples of the dimensions of a socket 102 and window 134 embodying the present invention. For a socket 102 having a length of 2" (approximately 50 mm) and having a 5/16" (approximately 8 mm) faceted opening for engagement with the torque nut 22, the approximate width of the socket will be approximately 0.446" (approximately 11 mm). If the driver is ¼" (approximately 6 mm), a faceted opening of 11/32" (approximately 8 mm) will be formed in the first end of the socket 102. A distance from the lower edge 138 of the socket 102 to the lower edge 136 of the window 134 will be approximately ½" (approximately 12 mm). The detached wrenching rings have a height of approximately ⅛" (approximately 3 mm), enabling at least three or four wrenching rings to be disposed within the socket 102 before they are exposed to the window 134. The depth of the window 134 is approximately ¼" (approximately 6 mm), and the distance between the lower edge 136 and the upper edge 140 of the window 134 is approximately ½" (approximately 12 mm) to enable the easy removal of one or more wrenching rings 26 from the socket 102. Of course, it will be appreciated that these dimensions may be adjusted depending upon the size of the socket 102, the size of the detachable wrenching ring 26, etc.

Figure 13:
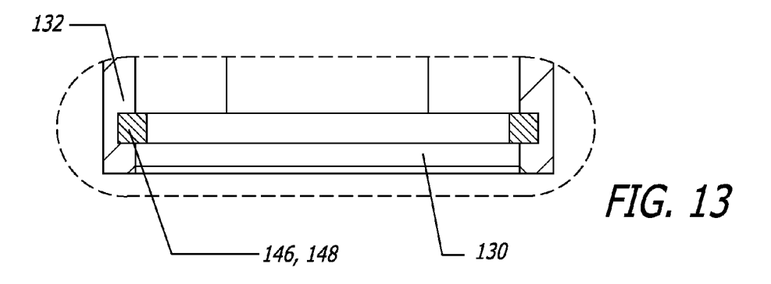
FIG. 13 is an enlarged cross-sectional view of area "13" of FIG. 12, illustrating a catch of the assembly.
Figure 14:
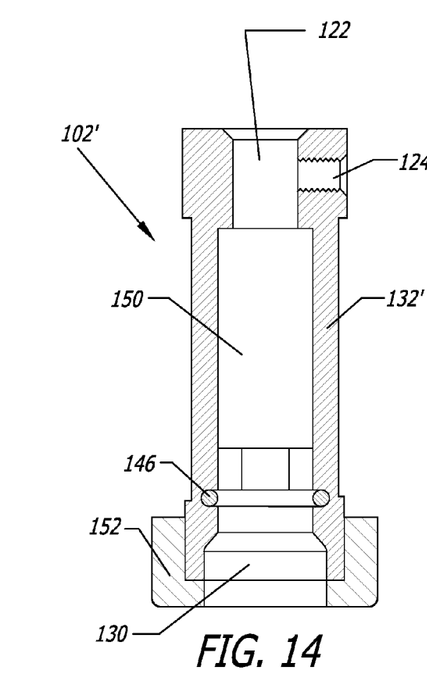
FIG. 14 is a cross-sectional view of another socket embodying the present invention.

With reference now to FIGS. 13 and 14, the socket 102 preferably includes a catch 146, configured to permit insertion of the wrenching ring 26 into the second end 130 of the socket 102, but prevent the detached wrenching ring 26 from freely falling out of the second end 130 of the socket 102. In one embodiment, the catch 146 comprises a resilient ring disposed within an annular groove formed on the interior surface of the sidewall 132 of the socket 102 adjacent to the second end 128 thereof. The resilient ring 146, for example, can be comprised of a metallic ring having spring characteristics and a notch formed therein so as to enable insertion of the ring within the annular groove 148. The ring 146 is biased slightly so as to present a reduced diameter in the opening 130 of the socket 102, but be pressed inwardly into the groove 148 so as to enable passage of the wrenching ring 26 thereby.

When the first wrenching ring 26 is initially detached, the resilient ring or catch 146 holds the detached wrenching ring in place within the socket 102 so that it does not fall from the open end 130 of the socket 102. When a subsequent breakaway torque nut 22, and particularly the wrenching ring portion 26 thereof, is engaged by the open end 130 of the socket 102, the first detached wrenching ring 26 is pushed upwardly into the internal chamber and body of the socket 102, as illustrated in FIG. 5. The second wrenching ring 26, once detached, is held in place by the catch resilient ring 146. This occurs until a desired number of wrenching rings have been removed, or no additional detached wrenching rings can be fit within the inner chamber 150 of the socket 102.

Figure 15:
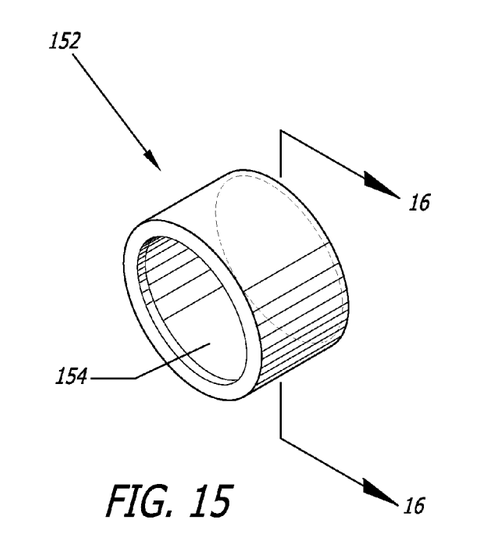
FIG. 15 is a perspective view of a socket cover, used in accordance with the present invention.
Figure 16:
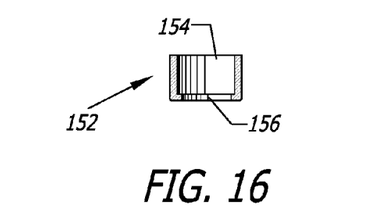
FIG. 16 is a cross-sectional view taken generally along line 16-16 of FIG. 15.

With reference now to FIGS. 15 and 16, the socket 102 is typically comprised of a hard and durable material, such as metal, carbon fiber, or the like so as to apply the needed force to the breakaway torque nut 22 and fasten it to the bolt 10. This can present problems, however, in that the lower edge 138 of the socket 102 can scratch or otherwise mar the surface of the objects to be joined to one another. This is particularly the case when the outer surface of the object facing the socket 102 has been painted or finished. To reduce or even eliminate the possibility of such scratching or marring, a cover 152 comprised of a material having a low coefficient of friction is attached to the lower edge 138 and lower end 128 of the socket 102. This can be seen, for example, in FIGS. 6 and 14. The material having a low coefficient of friction may comprise a self-lubricating Teflon material. The cover 152 may be formed as a separate piece, as illustrated in FIGS. 15 and 16, and friction-fitted or adhered onto the end 128 of the socket 102, or the end 128 of the socket 102 may be dipped into a melted material having a low coefficient of friction, which later hardens and forms a scratch resistant surface which might come into contact with the object being fastened.

In the embodiment illustrated in FIGS. 14-16, the cover 152 includes a first opening 154 which has a diameter which is approximately equal or slightly greater than the outer diameter of the end 128 of the socket 102, so as to fit thereover. A second, somewhat smaller, opening 156 is formed at generally the opposite end of the cover 152 which corresponds with the opening 130 of the socket 102 so as to permit passage of the necessary portions of the breakaway torque nut 22 therethrough.

With reference now to FIGS. 6 and 17-19, the assembly of the present invention includes a gate associated with the window 134 of the socket, which is adapted to selectively allow the user to permit passage of one or more detached wrenching rings 26 through the window 134, as illustrated in FIG. 5, or prevent passage of a detached wrenching ring 26 through the window 134. In the illustrated embodiment, the gate comprises a sleeve 104 slidably disposed on a sidewall 132 of the socket 102. The sleeve 104 is typically generally cylindrical in shape and has generally opposite openings 158 and 160. Within the body 162 of the sleeve 104 an aperture 164 is formed. The aperture 164 is selectively alignable with the window 134 of the socket 102, as illustrated in FIG. 5, to permit passage of detached wrenching rings 26 therethrough and from the interior of the socket 102 to the exterior thereof. The aperture 164 may be approximately the size of the socket window 134, or may be larger or smaller, but in any case is sufficiently sized so as to permit a detached wrenching ring 26 to pass therethrough.

Figure 17:
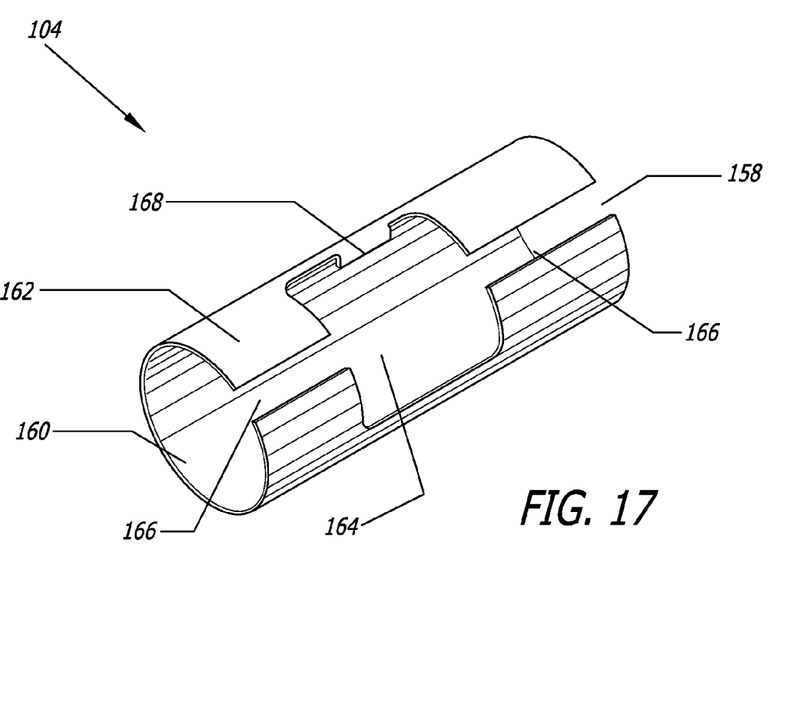
FIG. 17 is a perspective view of a sleeve used in accordance with the present invention.
Figure 18:
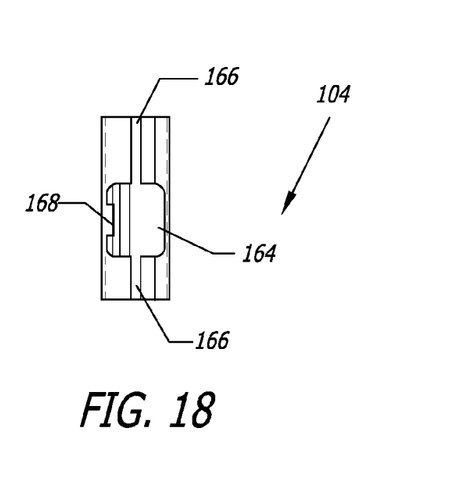
FIG. 18 is a front elevational view of the sleeve of FIG. 17.
Figure 19:
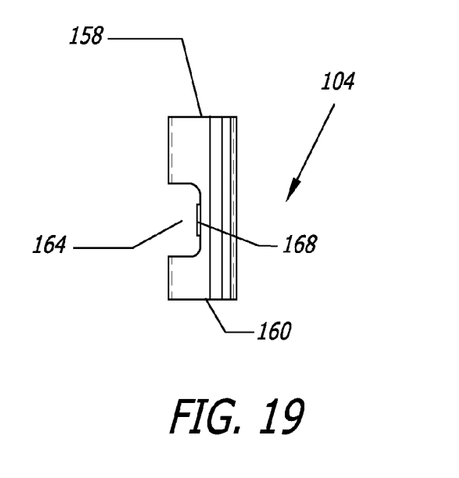
FIG. 19 is a side elevational view of the sleeve of FIG. 17.

The body 162 of the sleeve 104 has an internal diameter which is slightly greater than the exterior diameter of the sidewall 132 of the socket 102 over which it is disposed. However, the sleeve 104 is configured so as not to easily slip off of the socket 102. This can be done in a different number of ways. For example, the sleeve 104 may be comprised of resilient material and include one or more slits 166 which allow the sleeve 104 to be slightly enlarged in diameter so as to be snap-fit over the socket 102. In such case, slits 166 may extend from the open ends 158 and 160 generally along the length of the body 162, or to the aperture 164, as illustrated. Although a snap-fit connection will be made between the sleeve 104 and the socket 102, the sleeve 104 can still be manually slid and rotated about the exterior surface of the socket 102.

With reference again to FIG. 14, the sidewall 132' of the socket 102' may have a section of reduced diameter, forming a recessed area, corresponding to the length and size of the sleeve 104 such that the sleeve 104 can be fit over that portion of the socket 102 and be freely rotated in order to selectively align and misalign the aperture 164 of the sleeve 104 and the window 134 of the socket 102, to permit selective removal of the wrenching rings 26.

It has been found that as the socket 102 is rotated during the installation of the breakaway torque nut 22 onto the bolt 10, the sleeve 104 can either be rotated or remain stationary, which can cause inadvertent alignment of the aperture 164 with the window 134, permitting detached wrenching rings 26 within the socket 102 to fall out of the socket 102 unintentionally. In order to prevent this, a tab 168 is formed in the body 162 on an edge of the aperture 164, as illustrated, the tab 168 engaging an edge of the window 134 so as to control the alignment of the aperture 164 and the window 134. That is, when the socket 102 is rotated by the driving tool, the tab 168 which extends into the aperture 164 of the sleeve 104 will come into engagement with a side edge 142 or 144 of the window 134 of the socket 102, causing the sleeve 104 to be rotated with the socket 102.

When the desired number or maximum number of detached wrenching rings 26 are disposed within the socket 102, the user simply slides or rotates the sleeve 104 until the aperture 164 is generally aligned with the socket window 134, so as to controllably remove the detached wrenching rings 26. This can be done, for example, by aligning the aperture 164 of the sleeve 104 and the socket window 134, and tilting the socket towards its generally horizontal position such that the detached wrenching rings 26 slide out of the aligned aperture 164 and window 134. In this manner, the installer may controllably move the detached wrenching rings 26 into his or her palm or container such that the detached wrenching rings 26 do not become lost and unaccounted for.

Although several embodiments have been described in detail for purposes of illustration, various modifications may be made without departing from the scope and spirit of the invention. Accordingly, the invention is not to be limited, except as by the appended claims.

What is claimed is:

1. A fastener tool assembly for installing breakaway torque nuts, comprising:
   a socket having:
   a first end configured to attach to a driver of a fastener tool;
   a second end generally opposite the first end and configured to operably engage a detachable wrenching ring of a breakaway torque nut;
   a generally cylindrical side wall extending between the first end and the second end, the side wall having a window formed transversely therein intermediate the first and second ends;
   wherein a lower edge of the window is spaced from a lower edge of the socket at least a distance corresponding to a plurality of stacked wrenching rings; and
   wherein the window is sized and configured to permit at least one wrenching ring to pass therethrough.

2. The assembly of claim 1, including a catch configured to permit insertion of the wrenching ring into the second end of the socket, but prevent the detached wrenching ring from freely falling out of the second end of the socket.

3. The assembly of claim 2, wherein the catch comprises a resilient ring disposed within the socket adjacent to the second end.

4. The assembly of claim 1, including a set screw extending through the side wall of the socket and into engagement with the driver of the fastening tool.

5. The assembly of claim 1, including a gate associated with the window and adapted to selectively permit passage of a detached wrenching ring through the window or prevent passage of a detached wrenching ring through the window.

6. The assembly of claim 5, wherein the gate comprises a sleeve slidably disposed on the side wall of the socket and having an aperture selectively alignable with the window.

7. The assembly of claim 6, wherein the sleeve is disposed over a recessed portion of the side wall intermediate the first and second ends.

8. The assembly of claim 6, wherein the sleeve includes a tab extending into the aperture and configured to engage an edge of the window.

9. The assembly of claim 6, wherein the sleeve is comprised of a resilient material and includes an elongated slit providing snap-fit connection to the socket.

10. The assembly of claim 1, including a cover comprised of a material having a low coefficient of friction attached to a lower edge of the socket.

11. The assembly of claim 10, wherein the cover comprises a self-lubricating Teflon material.

12. The assembly of claim 1, including a pin insertable through the socket and engaging a bolt to which the breakaway torque nut is attached.

13. The assembly of claim 12, wherein the fastener tool comprises a wrench including a handle having a ratchet head, the driver being operably coupled to the ratchet head, and wherein the ratchet head and driver have aligned passageways adapted for the pin to pass therethrough.

14. A fastener tool assembly for installing breakaway torque nuts, comprising:
    a socket having a first end configured to attach to a driver of a fastener tool, a second end generally opposite the first end and configured to operably engage a detachable wrenching ring of a breakaway torque nut, a generally cylindrical side wall extending between the first end and the second end, the side wall having a window formed transversely therein intermediate the first and second ends, a lower edge of the window being spaced from a lower edge of the socket at least a distance corresponding to a plurality of stacked wrenching rings, and the window being sized and configured to permit at least one wrenching ring to pass therethrough;
    a catch configured to permit insertion of the wrenching ring into the second end of the socket, but prevent the detached wrenching ring from freely falling out of the second end of the socket; and
    a gate associated with the window and adapted to selectively permit passage of a detached wrenching ring through the window or prevent passage of a detached wrenching ring through the window.

15. The assembly of claim 14, wherein the catch comprises a resilient ring disposed within the socket adjacent to the second end.

16. The assembly of claim 14, including a set screw extending through the side wall of the socket and into engagement with the driver of the fastening tool.

17. The assembly of claim 14, wherein the gate comprises a sleeve slidably disposed on the side wall of the socket and having an aperture selectively alignable with the window.

18. The assembly of claim 17, wherein the sleeve is disposed over a recessed portion of the side wall intermediate the first and second ends.

19. The assembly of claim 17, wherein the sleeve includes a tab extending into the aperture and configured to engage an edge of the window.

20. The assembly of claim 17, wherein the sleeve is comprised of a resilient material and includes an elongated slit providing snap-fit connection to the socket.

21. The assembly of claim 14, including a cover comprised of a material having a low coefficient of friction attached to a lower edge of the socket.

22. The assembly of claim 21, wherein the cover comprises a self-lubricating Teflon material.

23. The assembly of claim 14, wherein the fastener tool comprises a wrench including a handle having a ratchet head, the driver operably coupled to the ratchet head, and a pin extending through aligned passageways of the ratchet head, driver and socket and configured to engage a bolt to which the breakaway torque nut is attached.

* * * * *